United States Patent
Janarthanam et al.

(10) Patent No.: US 10,286,774 B2
(45) Date of Patent: May 14, 2019

(54) MULTIPLE ZONED RADIATOR

(71) Applicant: FORD GLOBAL TECHNOLOGIES, LLC, Dearborn, MI (US)

(72) Inventors: Suriyaprakash Ayyangar Janarthanam, Westland, MI (US); Neil Robert Burrows, White Lake Township, MI (US); Bhaskara Boddakayala, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 837 days.

(21) Appl. No.: 14/256,039

(22) Filed: Apr. 18, 2014

(65) Prior Publication Data
US 2015/0298538 A1 Oct. 22, 2015

(51) Int. Cl.
| | |
|---|---|
| B60L 58/26 | (2019.01) |
| F28D 1/04 | (2006.01) |
| B60K 11/04 | (2006.01) |
| F01P 3/18 | (2006.01) |

(52) U.S. Cl.
CPC ........... B60K 11/04 (2013.01); B60L 58/26 (2019.02); F01P 3/18 (2013.01); F01P 2003/185 (2013.01); F01P 2003/187 (2013.01); F28D 1/0443 (2013.01); Y02T 10/705 (2013.01); Y02T 10/7005 (2013.01)

(58) Field of Classification Search
CPC .. F28D 1/0443; B60L 58/26; F01P 2003/182; F01P 2003/185
USPC .......................................... 165/51, 140, 144
See application file for complete search history.

(56) References Cited

U.S. PATENT DOCUMENTS

| | | | | | |
|---|---|---|---|---|---|
| 1,782,394 | A | * | 11/1930 | Beimling | F01P 3/18 165/140 |
| 1,849,946 | A | * | 3/1932 | Modine | F28D 1/024 165/122 |
| 3,447,596 | A | * | 6/1969 | Hughes | B60H 1/3227 165/122 |
| 5,086,835 | A | * | 2/1992 | Shinmura | F28D 1/0435 123/41.51 |
| 5,526,873 | A | * | 6/1996 | Marsais | F01P 3/18 165/51 |
| 5,575,326 | A | * | 11/1996 | Asami | F24F 1/0007 165/122 |
| 6,124,644 | A | * | 9/2000 | Olson | F01P 3/20 180/165 |
| 6,394,176 | B1 | * | 5/2002 | Marsais | F25B 39/04 165/140 |
| 6,609,484 | B2 | * | 8/2003 | Penn | F01P 3/18 123/41.29 |
| 6,789,613 | B1 | * | 9/2004 | Ozaki | F01P 3/18 165/140 |

(Continued)

FOREIGN PATENT DOCUMENTS

| | | |
|---|---|---|
| EP | 2239811 A1 | 10/2010 |
| KR | 10-1180790 | 9/2012 |

(Continued)

*Primary Examiner* — Leonard R Leo
(74) *Attorney, Agent, or Firm* — Carlson, Gaskey & Olds

(57) ABSTRACT

A radiator according to an exemplary aspect of the present disclosure includes, among other things, a first zone that includes a first fan coverage area and a second zone that includes a second fan coverage area that is different from the first fan coverage area.

9 Claims, 5 Drawing Sheets

(56) References Cited

U.S. PATENT DOCUMENTS

| | | | | |
|---|---|---|---|---|
| 7,284,594 B2* | 10/2007 | Sanada | ............... | F25B 39/04 |
| | | | | 165/41 |
| 7,310,961 B2* | 12/2007 | Hoshi | ............... | B60H 1/004 |
| | | | | 165/42 |
| 7,406,835 B2* | 8/2008 | Allen | ............... | F28D 1/0443 |
| | | | | 123/41.02 |
| 7,669,558 B2* | 3/2010 | Claypole | ............... | B60K 11/02 |
| | | | | 123/41.51 |
| 7,699,028 B2* | 4/2010 | Guerrero | ............ | B60H 1/3227 |
| | | | | 123/41.29 |
| 8,061,410 B2* | 11/2011 | Machanek | ............ | F28D 1/0443 |
| | | | | 165/140 |
| 8,336,319 B2 | 12/2012 | Johnston et al. | | |
| 8,402,776 B2 | 3/2013 | Johnston et al. | | |
| 8,430,069 B2* | 4/2013 | Min | ............... | B60H 1/00328 |
| | | | | 123/41.29 |
| 8,448,696 B2 | 5/2013 | Johnston et al. | | |
| 9,657,968 B2* | 5/2017 | Okada | ............... | F25B 9/02 |
| 2010/0078148 A1* | 4/2010 | Jouanny | ............... | F01P 7/165 |
| | | | | 165/51 |
| 2011/0073285 A1 | 3/2011 | Benoit et al. | | |
| 2012/0199313 A1* | 8/2012 | Frainet | ............... | F01P 7/165 |
| | | | | 165/148 |
| 2013/0255601 A1 | 10/2013 | Gooden et al. | | |
| 2015/0107919 A1* | 4/2015 | Hutchins | ............... | B60K 6/48 |
| | | | | 180/65.25 |

FOREIGN PATENT DOCUMENTS

| | | |
|---|---|---|
| KR | 20130096589 A | 8/2013 |
| WO | 2013072744 A1 | 5/2013 |
| WO | 2013076405 A1 | 5/2013 |

* cited by examiner

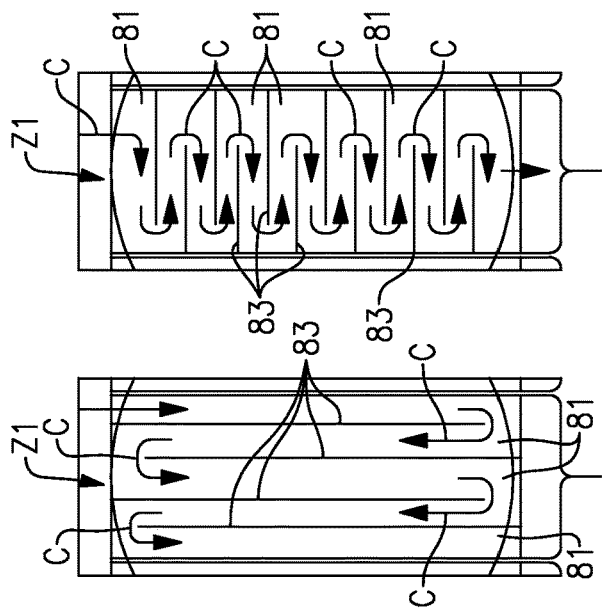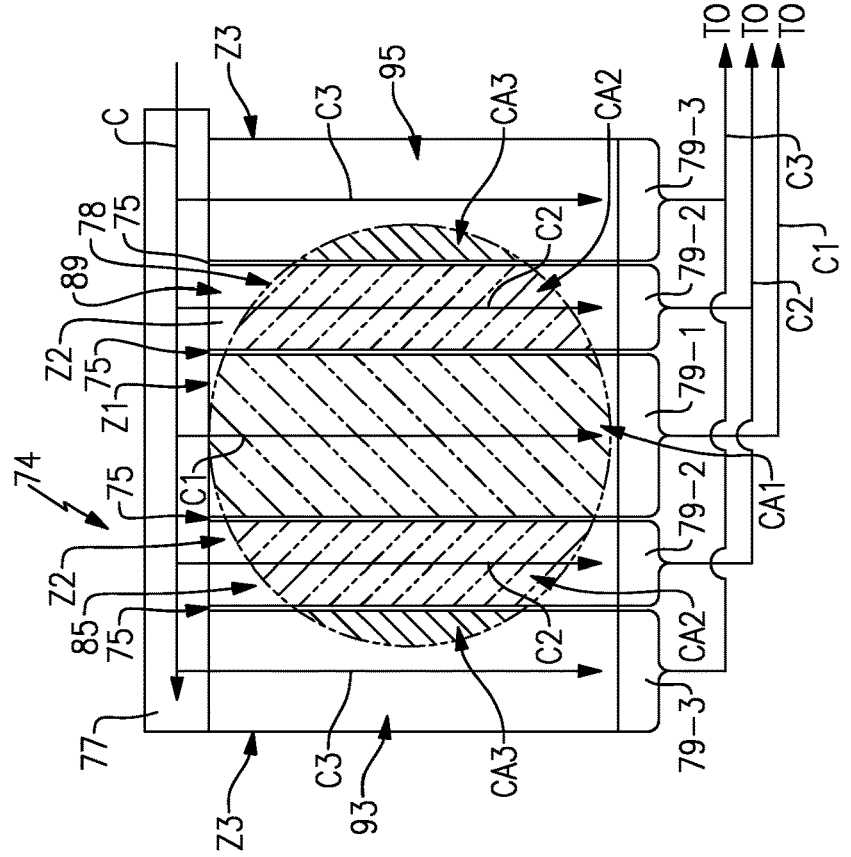

MULTIPLE ZONED RADIATOR

TECHNICAL FIELD

This disclosure relates to a thermal management system, and more particularly, but not exclusively, to a thermal management system for an electrified vehicle that includes a radiator equipped with multiple zones.

BACKGROUND

Electrified vehicles, such as hybrid electric vehicles (HEV's), plug-in hybrid electric vehicles (PHEV's), battery electric vehicles (BEV's), or fuel cell vehicles differ from conventional engine vehicles in that they are powered by one or more electric machines (i.e., electric motors and/or generators) instead of or in addition to an internal combustion engine. High voltage current for powering the electric machines is typically supplied by a high voltage traction battery pack.

Many electrified vehicles include thermal management systems that manage the thermal demands of various components during vehicle operation. Typically, the thermal management system includes several separate heat exchangers that heat and/or cool coolant that is circulated through the various loops of the thermal management system. These heat exchangers add package space, weight and cost for a given vehicle architecture.

SUMMARY

A radiator according to an exemplary aspect of the present disclosure includes, among other things, a first zone that includes a first fan coverage area and a second zone that includes a second fan coverage area that is different from the first fan coverage area.

In a further non-limiting embodiment of the foregoing radiator, a third zone includes a third fan coverage area that is different from both the first fan coverage area and the second fan coverage area.

In a further non-limiting embodiment of either of the foregoing radiators, the first zone is a low temperature zone, the second zone is a moderate temperature zone, and the third zone is a high temperature zone.

In a further non-limiting embodiment of any of the foregoing radiators, at least one partition divides the first zone from the second zone.

In a further non-limiting embodiment of any of the foregoing radiators, an inlet manifold feeds coolant to both the first zone and the second zone.

In a further non-limiting embodiment of any of the foregoing radiators, a first outlet manifold is associated with the first zone and a second outlet manifold is associated with the second zone.

In a further non-limiting embodiment of any of the foregoing radiators, the first zone includes multiple flow paths.

In a further non-limiting embodiment of any of the foregoing radiators, a plurality of walls inside the first zone establish the multiple flow paths.

In a further non-limiting embodiment of any of the foregoing radiators, the second zone is split into a first section on a first side of the first zone and a second section on a second side of the first zone.

In a further non-limiting embodiment of any of the foregoing radiators, a third zone includes a third fan coverage area that is different from the first fan coverage area and the second fan coverage area.

A thermal management system according to another exemplary aspect of the present disclosure includes, among other things, a radiator that includes at least a first zone and a second zone. The first zone is configured to supply coolant at a first temperature to a battery pack and the second zone is configured to supply coolant at a second temperature to a second vehicle component.

In a further non-limiting embodiment of the foregoing system, a radiator fan draws airflow through the radiator.

In a further non-limiting embodiment of either of the foregoing systems, the radiator fan is positioned relative to the radiator such that a first fan coverage area is associated with the first zone and a second fan coverage area is associated with the second zone.

In a further non-limiting embodiment of any of the foregoing systems, the first fan coverage area is larger than the second fan coverage area.

In a further non-limiting embodiment of any of the foregoing systems, the radiator includes a third zone configured to supply coolant at a third temperature to a third vehicle component.

In a further non-limiting embodiment of any of the foregoing systems, the second vehicle component is one or more controllers and the third vehicle component is an engine.

In a further non-limiting embodiment of any of the foregoing systems, the first temperature is a lower temperature than the second temperature.

A method according to another exemplary aspect of the present disclosure includes, among other things, communicating coolant to a radiator that includes a first zone and a second zone, supplying coolant of a first temperature from the first zone to a battery pack and supplying coolant of a second temperature from the second zone to a second vehicle component.

In a further non-limiting embodiment of the foregoing method, the communicating step includes feeding the coolant into an inlet manifold that is fluidly connected to both the first zone and the second zone.

In a further non-limiting embodiment of either of the foregoing methods, a first fan coverage area is associated with the first zone and a second fan coverage area is associated with the second zone.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 illustrates a radiator according to a first embodiment of this disclosure.

FIGS. 4A and 4B illustrate a zone of a radiator.

DETAILED DESCRIPTION

This disclosure relates to a thermal management system that employs a multiple zoned radiator. For example, the radiator may include a first zone having a first fan coverage area and a second zone that includes a second fan coverage area that is different from the first fan coverage area. The first zone can supply coolant at a first temperature to a battery pack, and the second zone can supply coolant at a second temperature to another vehicle component. These and other features are discussed in greater detail within this detailed description.

Figure 1:
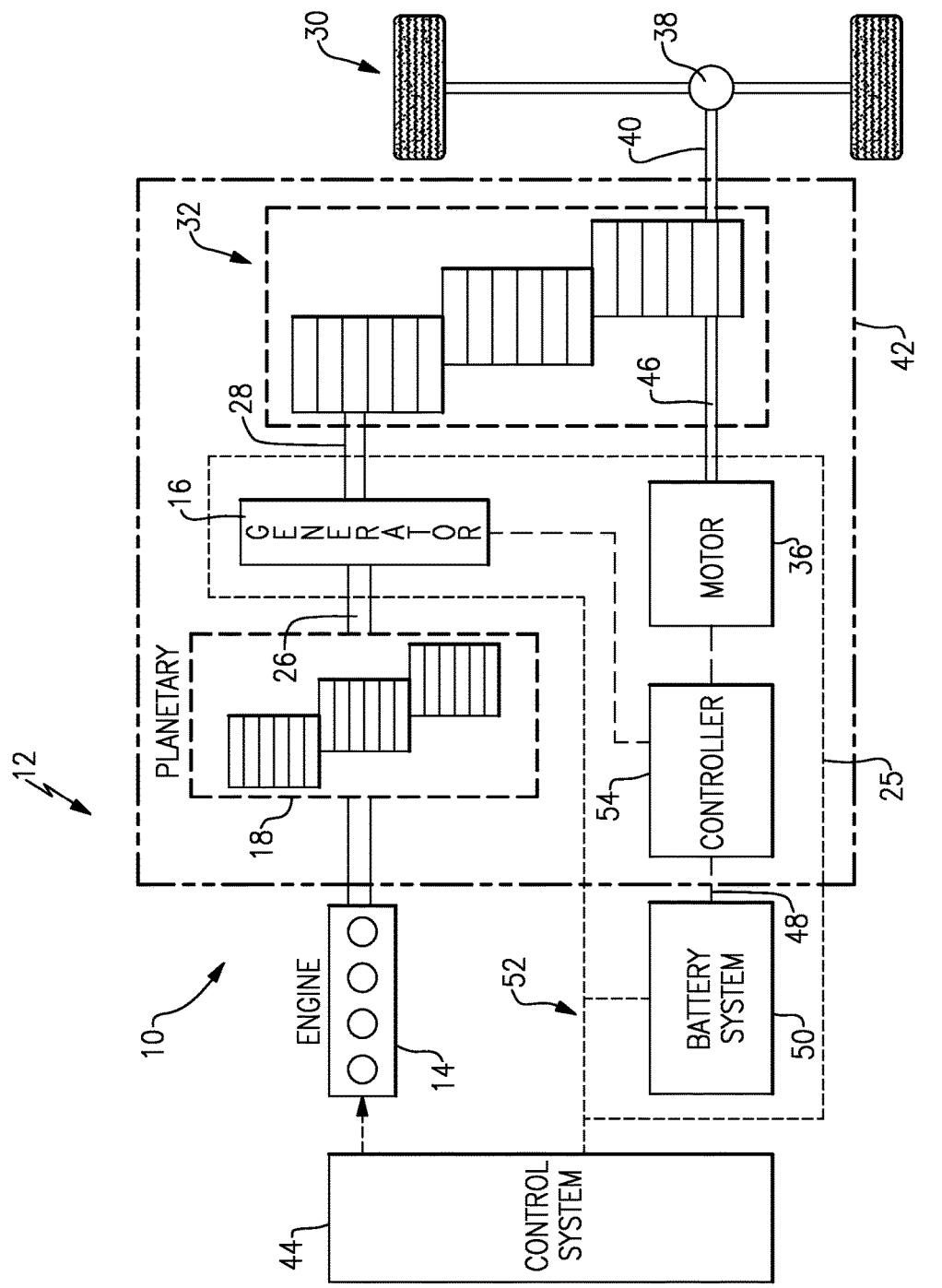
FIG. 1 schematically illustrates a powertrain of an electrified vehicle.

FIG. 1 schematically illustrates a powertrain 10 for an electrified vehicle 12, such as a HEV. Although depicted as a HEV, it should be understood that the concepts described herein are not limited to HEV's and could extend to other electrified vehicles, including but not limited to, PHEV's, BEV's, fuel cell vehicles, or any other alternate fuel vehicles or vehicles that use multiple radiators.

In one embodiment, the powertrain 10 is a hybrid drive system that employs a first drive system that includes a combination of an engine 14 and a generator 16 (i.e., a first electric machine) and a second drive system that includes at least a motor 36 (i.e., a second electric machine), the generator 16 and a battery system 50. For example, the motor 36, the generator 16 and the battery system 50 may make up an electric drive system 25 of the powertrain 10. The first and second drive systems generate torque to drive one or more sets of vehicle drive wheels 30 of the electrified vehicle 12, as discussed in greater detail below.

The engine 14, such as an internal combustion engine, and the generator 16 may be connected through a power transfer unit 18. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26. Because the generator 16 is operatively connected to the engine 14, the speed of the engine 14 can be controlled by the generator 16.

A shaft 28 is connected to vehicle drive wheels 30 through a second power transfer unit 32. The second power transfer unit 32 transfers torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery system 50. The battery system 50 may include a high voltage battery pack that is capable of outputting electrical power to operate the motor 36 and the generator 16. Other types of energy storage devices and/or output devices can also be incorporated for use with the electrified vehicle 12. The battery system 50 may be made up of one or more battery modules that include battery cells that store the energy necessary to power the motor 36 and/or generator 16.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 may also communicate with a battery control module of the battery system 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

Figure 2:
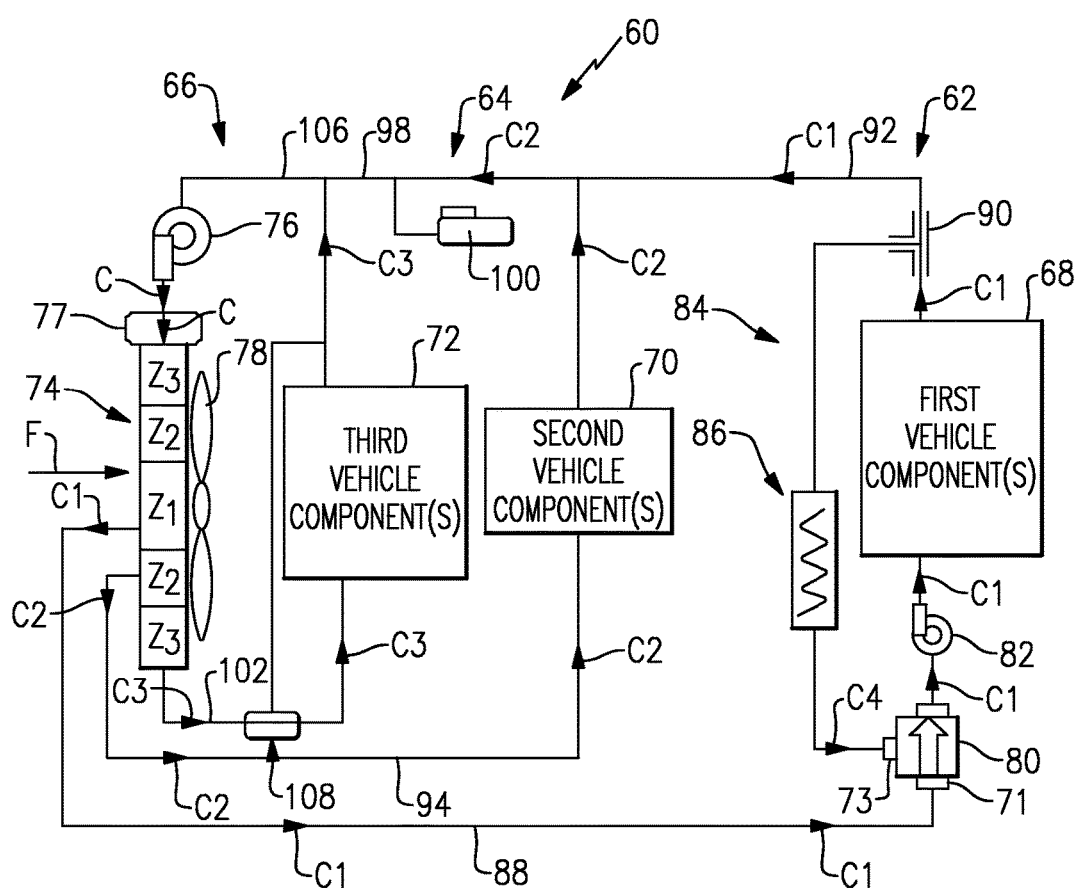
FIG. 2 illustrates a thermal management system according to a first embodiment of this disclosure.

FIG. 2 illustrates a thermal management system 60 that can be incorporated into an electrified vehicle. For example, the thermal management system 60 could be employed by the electrified vehicle 12 of FIG. 1 (or any other electrified vehicle) in order to manage the thermal loads generated by various vehicle components, such as the engine 14, the battery system 50 and/or the controllers 54. The thermal management system 60 can selectively communicate coolant C to such components to either cool or heat the component depending on ambient conditions and/or other conditions.

In one embodiment, the thermal management system 60 includes a first cooling loop 62, a second cooling loop 64 and third cooling loop 66. However, the thermal management system 60 could include a greater or fewer number of cooling loops within the scope of this disclosure.

The first cooling loop 62 is configured to supply a first portion C1 of a coolant C to a first vehicle component 68, the second cooling loop 64 is configured to supply a second portion C2 of the coolant C to a second vehicle component 70, and the third cooling loop 66 can supply a third portion C3 of the coolant C to a third vehicle component 72. In one non-limiting embodiment, the first vehicle component 68 is a high voltage battery pack, the second vehicle component 70 is a power motor and controller, and the third vehicle component 72 is an engine. Other vehicle components may alternatively or additionally be conditioned by the thermal management system 60. In other words, the first cooling loop 62, the second cooling loop 64 and the third cooling loop 66 can each supply coolant C to one or more components.

The coolant C may be a conventional type of coolant mixture, such as water mixed with ethylene glycol. Other coolants may also be suitable for use with the thermal management system 60.

A radiator 74 of the thermal management system 60 is in fluid communication with each of the first cooling loop 62, the second cooling loop 64 and the third cooling loop 66. In one embodiment, the radiator 74 is a multiple zoned, split flow radiator. The radiator 74 may be used to cool the portions of the coolant C that are supplied to each of the first cooling loop 62, the second cooling loop 64 and the third cooling loop 66.

In one non-limiting operating mode of the thermal management system 60, a pump 76 communicates the coolant C into an inlet manifold 77 of the radiator 74. The coolant C may then be divided into a plurality of zones Z1, Z2 and Z3 that are fluidly connected to the inlet manifold 77. The first zone Z1 includes the first portion C1 of the coolant C that is supplied to the first cooling loop 62, the second zone Z2 includes the second portion C2 of the coolant C that is supplied to the second cooling loop 64, and the third zone Z3 contains the third portion C3 of the coolant C that is supplied to the third cooling loop 66 of this embodiment.

A radiator fan 78 may be positioned adjacent to the radiator 74. In one embodiment, the radiator fan 78 is immediately adjacent to the radiator 74. The radiator fan 78 draws airflow F through the radiator 74 for undergoing heat transfer with the coolant C. For example, the airflow F exchanges heat with the coolant C to cool the coolant C. Heat from the coolant C is removed into the airflow F prior to communicating the portions C1, C2 and C3 of the coolant C to the first cooling loop 62, the second cooling loop 64, and the third cooling loop 66, respectively, for cooling the vehicle components 68, 70, and 72.

In one non-limiting embodiment, the first portion C1 of the coolant C exits the radiator 74 into a line 88 of the first cooling loop 62 and is communicated to a three-way valve 80. The three-way valve 80 may be positioned upstream from the first vehicle component 68 to control the flow of the first portion C1 of the coolant C through the first vehicle component 68. A pump 82 may be positioned between the three-way valve 80 and the first vehicle component 68 for circulating the first portion C1 of the coolant C into and through the first vehicle component 68.

The first cooling loop 62 may additionally include a chiller loop 84. The chiller loop 84 includes a chiller 86 for providing additional cooling to the first portion C1 of the coolant C during certain conditions. For example, when an ambient temperature exceeds a predefined threshold, the three-way valve 80 may close an inlet 71 that connects to the line 88 of the first cooling loop 62 and open an inlet 73 that connects to the chiller loop 84 to provide a chilled coolant C4 to the first vehicle component 68. In other conditions, the inlet 73 of the three-way valve 80 is closed and the inlet 71 is opened to freely communicate the first portion C1 of the coolant C from the line 88 into the first vehicle component 68. A T-joint 90 may be located downstream of the first vehicle component 68 and is adapted to split the flow of the first portion C1 of the coolant C that exits the first vehicle component 68 between the chiller loop 84 and a line 92. The line 92 connects back to the radiator 74 to close the first cooling loop 62.

Meanwhile, the second portion C2 of the coolant C may exit the radiator 74 via a line 94 of the second cooling loop 64. The second portion C2 of the coolant C may be communicated to cool the second vehicle component 70. The second portion C2 of the coolant C may be returned to the radiator 74 via a line 98. The line 98 may connect with the line 92 of the first cooling loop 62.

The thermal management system 60 may employ one or more degas overflow tanks 100. In this embodiment, the degas overflow tank 100 is incorporated into the second cooling loop 64 downstream from the second vehicle component 70. However, the degas overflow tank 100 could be at any location within any cooling loop. The degas overflow tank 100 allows entrained air and gasses in the coolant C to be separated from the coolant C as it flows through the degas overflow tank 100.

Finally, the third portion C3 of the coolant C may selectively exit the radiator 74 via line 102 of the third cooling loop 66. The third portion C3 of the coolant C is communicated to the third vehicle component 72, which in one embodiment includes an engine. The third portion C3 of the coolant C may be returned to the radiator 74 via line 106 after cooling the third vehicle component 72. In one embodiment, the line 106 is connected to the line 98 of the second cooling loop 64.

The third cooling loop 66 may additionally include a thermostat 108. In one embodiment, the thermostat 108 is a dual stage continuous regulator valve configured to regulate an inlet temperature of the third vehicle component 72. The thermostat 108 may close the line 102 of the third cooling loop 66 under operating conditions where the third vehicle component 72 does not require cooling from the radiator 74. In other words, the thermostat 108 may prevent the communication of the third portion C3 of the coolant C during certain operating conditions.

FIG. 3 illustrates an exemplary radiator 74 that may be utilized by the thermal management system 60 described above. In one embodiment, the radiator 74 is a multi-zoned, split flow radiator. For example, the radiator 74 may include a first zone Z1, a second zone Z2 and a third zone Z3. Although three zones are illustrated in this exemplary embodiment, the radiator 74 could incorporate more or less zones within the scope of this disclosure. In one non-limiting embodiment, the radiator 74 could include two or more zones (see, for example, the radiator 174 of FIG. 5).

One or more partitions 75 may divide the first zone Z1, the second zone Z2 and the third zone Z3 from one another. In one embodiment, the first zone Z1 is positioned between the second zone Z2, and both the first and second zones Z1, Z2 are positioned between the third zone Z3. For example, the second zone Z2 may include a first section 85 on a first side of the first zone Z1 and a second section 89 on a second side of the first zone Z1, and the third zone Z3 may include a first section 93 next to the first section 85 of the second zone Z2 and a second section 95 adjacent to the second section 89 of the second zone Z2. The sections 93, 95 of the third zone Z3 are positioned on an opposite side of the second zone Z2 from the first zone Z1.

In one embodiment, the radiator 74 includes a single inlet manifold 77 that feeds coolant C to each of the first zone Z1, the second zone Z2 and the third zone Z3. Each zone Z1, Z2 and Z3 may include its own respective outlet manifold 79-1, 79-2 and 79-3. In other words, in one embodiment, the zones Z1, Z2 and Z3 share a common inlet but do not share common outlets. The outlet manifold 79-1 of the first zone Z1 supplies a first portion C1 of the coolant C to a first vehicle component 68 (see FIG. 2), the outlet manifolds 79-2 of the second zone Z2 supply second portions C2 of the coolant C to a second vehicle component 70, and the outlet manifolds 79-3 of the third zone Z3 supply third portions C3 of the coolant C to a third vehicle component 72.

In one non-limiting embodiment, the first zone Z1 is a relatively low temperature zone, the second zone Z2 is a relatively moderate temperature zone, and the third zone Z3 is a relatively high temperature zone. The relative temperatures of each zone Z1, Z2 and Z3 may be controlled by virtue of each zone's positioning relative to a radiator fan 78. The radiator fan 78 may be positioned relative to the radiator 74 to establish various fan coverage areas for each of the first zone Z1, the second zone Z2 and the third zone Z3. The fan coverage area represents the total area of each zone Z1, Z2 and Z3 where airflow is pulled through the radiator 74 by the radiator fan 78.

For example, in one non-limiting embodiment, the first zone Z1 includes a first fan coverage area CA1, the second zone Z2 includes a second fan coverage area CA2, and the third zone Z3 includes a third fan coverage area CA3. The fan coverage areas CA1, CA2 and CA3 encompass different total areas. The fan coverage area CA1 associated with the first zone Z1 includes the largest fan coverage area and nearly encompasses the entire first zone Z1 since the first zone Z1 is a relatively low temperature zone in this embodiment. The fan coverage area CA2 associated with the second zone Z2 is smaller than the fan coverage area CA1 and may cover around 75% of the total area of the second zone Z2 in order to provide a moderate temperature zone. The fan coverage area CA3 of the third zone Z3 is a relatively small coverage area in this embodiment because the third zone Z3 is designed as a relatively high temperature zone. In other words, the third zone Z3 has the smallest fan coverage area (e.g., less than 25% of the total area of the third zone Z3 in one embodiment), and therefore the third portion C3 of the coolant C that flows through the third zone Z3 is cooled less than the portions C1 and C2 of the coolant C that are communicated through the first zone Z1 and the second zone Z2, respectively.

Referring to FIGS. 4A and 4B, the first zone Z1 may include multiple flow paths 81. The multiple flow paths 81 may be established by a plurality of walls 83 that extend inside the first zone Z1. The multiple flow paths 81 and the plurality of walls 83 improve heat transfer between the coolant C and the airflow F (see FIG. 2) that is drawn through the radiator 74, thereby providing adequate cooling for low temperature applications such as a high voltage battery pack. In one embodiment, the plurality of walls 83 are vertically extending walls (see FIG. 4A). In another embodiment, the plurality of walls 83 are horizontally extending walls (see FIG. 4B). Other configurations may also be utilized for establishing multiple flow paths within a particular zone of the radiator 74.

Figure 5:
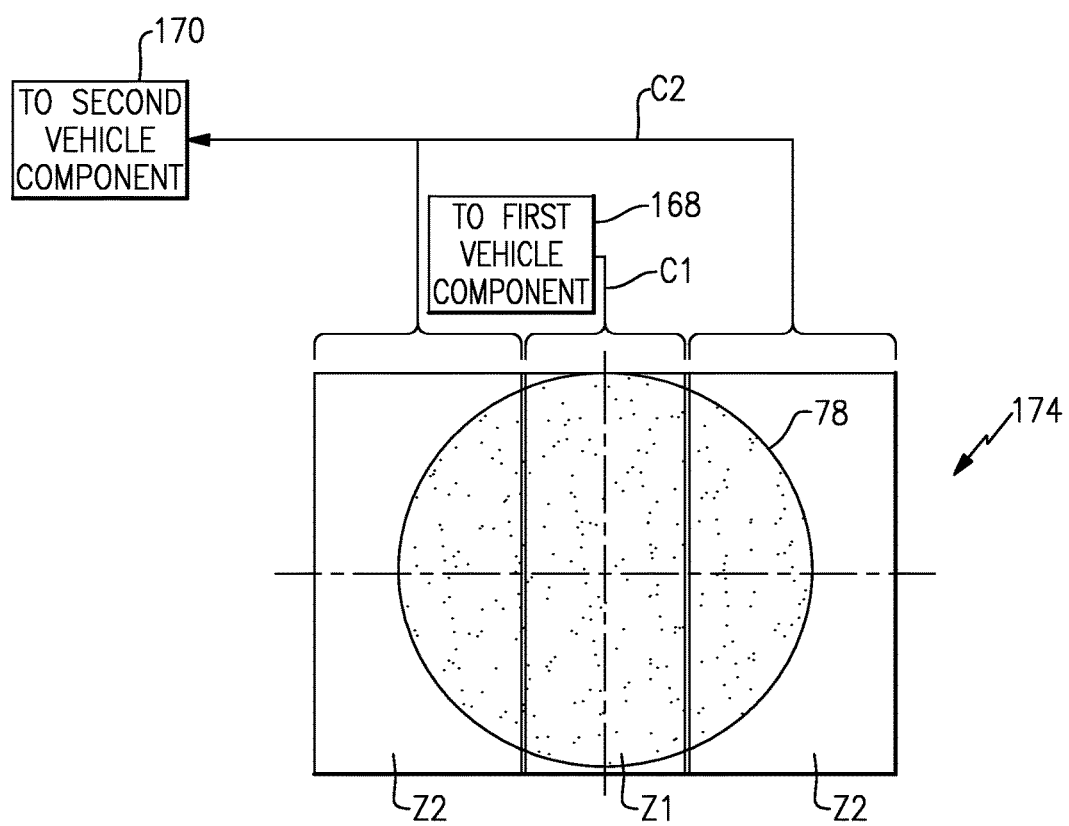
FIG. 5 illustrates a radiator according to a second embodiment of this disclosure.

FIG. 5 illustrates another exemplary radiator 174. In this disclosure, like reference numbers designate like elements where appropriate and reference numerals with the addition of 100 or multiples thereof designate modified elements that are understood to incorporate the same features and benefits of the corresponding original elements.

In this embodiment, the radiator 174 includes two zones: a first zone Z1 and a second zone Z2. The first zone Z1 is a low temperature zone and the second zone Z2 is a higher temperature zone. The first zone Z1 can communicate a coolant C1 having a first temperature to a first vehicle component 168, and the second zone Z2 can communicate a coolant C2 having a second temperature that is greater than the first temperature of the coolant C1 to a second vehicle component 170.

Figure 6:
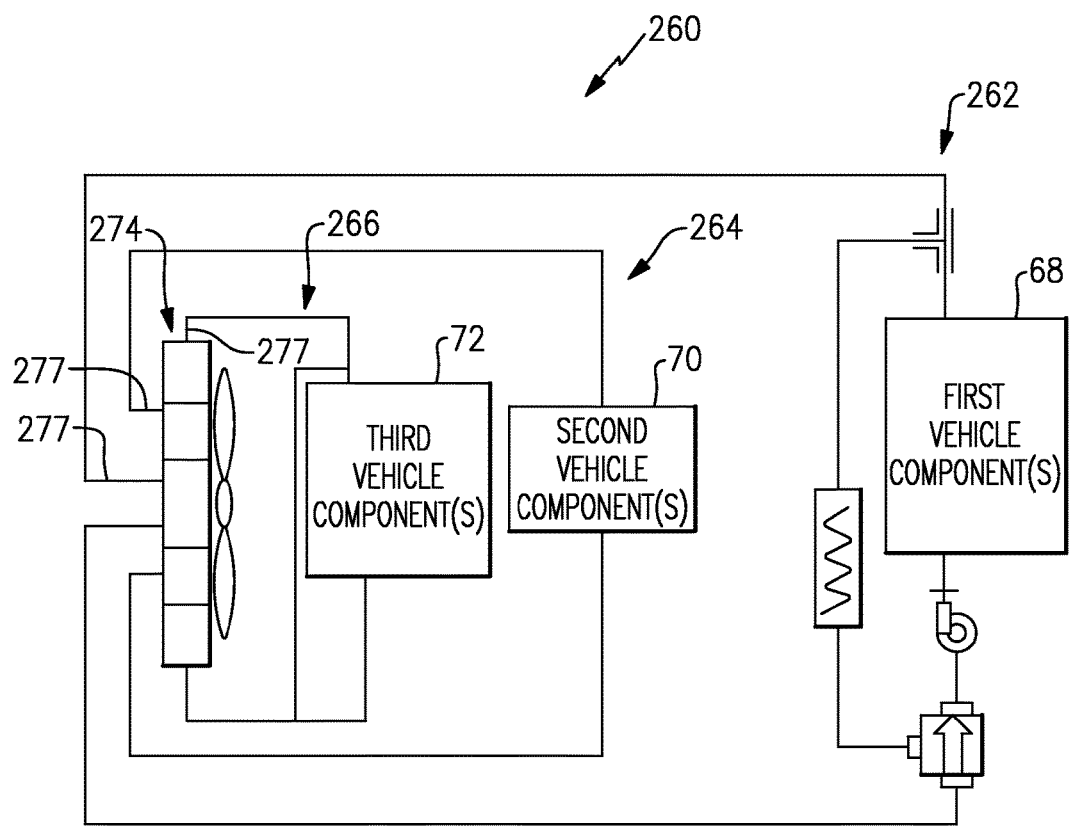
FIG. 6 illustrates a thermal management system according to a second embodiment of this disclosure.

FIG. 6 illustrates a thermal management system 260 according to a second embodiment of this disclosure. In this embodiment, rather than having a single, common inlet manifold, a radiator 274 of the thermal management system 260 includes multiple inlets 277 that feed into the radiator 274 from each of a first cooling loop 262, a second cooling loop 264 and a third cooling loop 266. The thermal management system 260 is otherwise substantially similar to the thermal management system 60 of FIG. 2.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

The invention claimed is:

1. A thermal management system, comprising:
a radiator that includes a first zone, a second zone, and a third zone; a battery pack, a motor controller, and an engine selectively conditioned by said radiator; wherein said first zone is configured to supply coolant at a first temperature to said battery pack, said second zone is configured to supply coolant at a second temperature to said motor controller, and said third zone is configured to supply coolant at a third temperature to said engine,
wherein said first zone, said second zone, and said third zone are coplanar, and said first zone is disposed between a first section and a second section of said second zone, and said second zone is disposed between a first section and a second section of said third zone.

2. The system as recited in claim 1, comprising a radiator fan that draws airflow through said radiator.

3. The system as recited in claim 2, wherein said radiator fan is positioned relative to said radiator such that a first fan coverage area is associated with said first zone and a second fan coverage area is associated with said second zone.

4. The system as recited in claim 3, wherein said first fan coverage area is larger than said second fan coverage area.

5. The system as recited in claim 1, wherein said first temperature is a lower temperature than said second temperature.

6. The system as recited in claim 1, wherein said first zone is part of a first cooling loop, said second zone is part of a second cooling loop, and said third zone is part of a third cooling loop.

7. The system as recited in claim 6, wherein said first cooling loop includes a chiller loop configured to selectively supply said coolant to said battery pack at a fourth temperature that is less than said first temperature.

8. The system as recited in claim 6, wherein at least one of said first cooling loop or said second cooling loop includes a degas overflow tank.

9. The system as recited in claim 6, wherein said third cooling loop includes a thermostat configured to regulate an inlet temperature of said engine.

* * * * *